(12) United States Patent
Kwon et al.

(10) Patent No.: US 8,509,329 B2
(45) Date of Patent: Aug. 13, 2013

(54) DATA RECEIVING APPARATUS FOR RECEIVING DATA FRAME USING CONSTELLATION MAPPING SCHEME AND DATA TRANSMISSION APPARATUS FOR TRANSMITTING THE DATE FRAME

(75) Inventors: Ui Kun Kwon, Hwaseong-si (KR); Tae Rim Park, Seoul (KR); Young Soo Kim, Seoul (KR); Eung Sun Kim, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 310 days.

(21) Appl. No.: 12/892,972

(22) Filed: Sep. 29, 2010

(65) Prior Publication Data

US 2011/0110443 A1    May 12, 2011

Related U.S. Application Data

(60) Provisional application No. 61/258,718, filed on Nov. 6, 2009.

(30) Foreign Application Priority Data

Mar. 30, 2010  (KR) .................... 10-2010-0028404

(51) Int. Cl.
 *H04L 27/28* (2006.01)
(52) U.S. Cl.
 USPC ........... 375/260; 375/267; 375/299; 375/347; 375/349; 455/102; 332/108; 332/119; 332/151
(58) Field of Classification Search
 USPC ................. 375/260, 261, 267, 269, 295, 296, 375/298, 299, 340, 347, 349; 455/101, 102; 332/108, 119, 151
 See application file for complete search history.

(56) References Cited

U.S. PATENT DOCUMENTS

| | | | |
|---|---|---|---|
| 5,982,819 A * | 11/1999 | Womack et al. ............... | 375/316 |
| 6,037,835 A * | 3/2000 | Smith et al. .................... | 329/316 |
| 7,269,430 B2 | 9/2007 | Moorti et al. | |
| 2002/0023247 A1* | 2/2002 | Akiyama et al. ............... | 714/758 |
| 2005/0113026 A1 | 5/2005 | Moorti et al. | |
| 2007/0147414 A1 | 6/2007 | Niu et al. | |
| 2007/0204052 A1 | 8/2007 | Trainin et al. | |
| 2008/0025423 A1* | 1/2008 | Wang et al. .................... | 375/260 |
| 2009/0073869 A1 | 3/2009 | Chadha et al. | |
| 2009/0122694 A1 | 5/2009 | Stephens et al. | |
| 2009/0240507 A1* | 9/2009 | Jax et al. ........................ | 704/500 |
| 2011/0194641 A1* | 8/2011 | Lim et al. ....................... | 375/295 |
| 2012/0014339 A1* | 1/2012 | Bitran et al. ................... | 370/329 |

FOREIGN PATENT DOCUMENTS

WO  WO 01/10046  2/2001

OTHER PUBLICATIONS

Tu et al., "Proposed TGac Preamble" *Power point Submisson for IEEE 802.11-10/0130r0*, Jan. 2010, slide 1-34.

* cited by examiner

*Primary Examiner* — Dac Ha
(74) *Attorney, Agent, or Firm* — NSIP Law (57) ABSTRACT

Disclosed are a data receiving apparatus that may discriminate a type of a received data frame, and a data transmission apparatus that may apply a constellation mapping scheme to a data frame so that a data receiving apparatus may discriminate the data frame in accordance with the constellation mapping scheme applied to the data frame.

15 Claims, 11 Drawing Sheets

FIG. 6

DATA RECEIVING APPARATUS FOR RECEIVING DATA FRAME USING CONSTELLATION MAPPING SCHEME AND DATA TRANSMISSION APPARATUS FOR TRANSMITTING THE DATE FRAME

CROSS-REFERENCE TO RELATED APPLICATION(S)

This application claims the benefit under 35 U.S.C. §119(e) of a U.S. Provisional Application No. 61/258,718, filed on Nov. 6, 2009, in the U.S. Patent and Trade Mark Office, and the benefit under 35 U.S.C. §119(a) of a Korean Patent Application No. 10-2010-0028404, filed on Mar. 30, 2010, in the Korean Intellectual Property Office, the entire disclosures of which are incorporated herein by reference for all purposes.

BACKGROUND

1. Field

The following description relates to a data receiving apparatus that may discriminate a type of a received data frame using a constellation mapping scheme, and a data transmission apparatus that may transmit the data frame.

2. Description of Related Art

A data throughput and its improvement may be considered important in the area of radio communication. For example, in the case of a local area network (LAN), an improvement of the throughput may be desirable in view of the increase in number of users and the availability of various applications using voice, video streaming, and the like.

Accordingly, to improve the throughput, a more advanced data transmission standard has been suggested. However, with a newly suggested data transmission standard, an issue may arise regarding coexistence and interoperability between a data transmission apparatus and a data receiving apparatus based on an existing data transmission standard.

SUMMARY

Accordingly, according to one general aspect, there is provided a data receiving apparatus capable of receiving a data frame from both a data transmission apparatus according to an existing data transmission standard and a data transmission apparatus according to a data transmission standard provided following the existing data transmission standard, and determining which data transmission standard among various data transmission standards is applied to the received data frame.

In another general aspect, there is provided a data transmission apparatus, including a constellation mapping unit configured to apply a first constellation mapping scheme to a first data frame, and a transmission unit configured to transmit the first data frame to a data receiving apparatus, wherein the data receiving apparatus receives the first data frame, receives, from a second data transmission apparatus, a second data frame where a second constellation mapping scheme is applied, and discriminates the first data frame and the second data frame in accordance with each of the first and second constellation mapping schemes.

Each of the first and second constellation mapping schemes may apply a constellation of mutually different schemes for a corresponding time interval in each of the first and second data frames.

At least one of the first and second constellation mapping schemes may include at least one of a binary phase-shift keying (BPSK) constellation mapping scheme, a quadrature BPSK (QBPSK) constellation mapping scheme, a +45 degree BPSK constellation mapping scheme, and a −45 degree BPSK constellation mapping scheme.

The first constellation mapping scheme may apply a constellation mapping scheme mutually different with respect to a first time interval and a second time interval, each time interval being included in the first data frame.

The first data frame may be modulated using an orthogonal frequency division multiplexing (OFDM) scheme. The constellation mapping unit may group, into a first sub carrier group and a second sub carrier group, a plurality of sub carriers of an OFDM symbol included in the first data frame, and the first constellation mapping scheme may apply a constellation mapping scheme mutually different with respect to the first sub carrier group and the second sub carrier group.

The constellation mapping unit may group, into the first sub carrier group, odd-numbered sub carriers from the plurality of sub carriers, and group, into the second sub carrier group, even-numbered sub carriers from the plurality of sub carriers.

The constellation mapping unit may apply a BPSK constellation mapping scheme to the first sub carrier group, and apply a QBPSK constellation mapping scheme to the second sub carrier group.

The constellation mapping unit may apply a +45 degree BPSK constellation mapping scheme to the first sub carrier group, and apply a −45 degree BPSK constellation mapping scheme to the second sub carrier group.

The constellation mapping unit may apply the first constellation mapping scheme to a predetermined time interval of the first data frame.

The constellation mapping unit may change a time interval where the first constellation mapping scheme is applied.

In another general aspect, there is provided a data receiving apparatus, including a reception unit configured to receive a first data frame where a first constellation mapping scheme is applied, and to receive a second data frame where a second constellation mapping scheme is applied, a determination unit configured to determine a constellation mapping scheme applied to each of the first and second data frames, and a frame identification unit configured to identify the first frame and the second frame in accordance with the determined constellation mapping scheme.

Each of the first and second constellation mapping schemes may apply a constellation of mutually different schemes for a corresponding time interval in each of the first and second data frames.

The determination unit may separately generate a decision matrix with respect to the first and second data frames, and compare the separately generated decision matrix with a predetermined threshold value to thereby determine the constellation mapping scheme.

The determination unit may generate the decision matrix by adding a value of a real number portion of each of the first and second data frames and adding a value of an imaginary number portion of each of the first and second data frames.

The determination unit may generate the decision matrix by reducing a value of a real number portion of each of the first and second data frames and reducing a value of an imaginary number portion of each of the first and second data frames.

In another general aspect, there is provided a method of receiving data by a data receiving apparatus capable of receiving a first data frame where a first constellation mapping scheme is applied and a second data frame where a second constellation mapping scheme is applied, the method including receiving the first data frame where the first constellation mapping scheme is applied, and processing the first data frame according to a constellation mapping scheme applied to the first data frame.

The method may further include receiving the second data frame where the second constellation mapping scheme is applied, determining the constellation mapping scheme applied to each of the first and second data frames, and identifying the first frame and the second frame in accordance with the determined constellation mapping scheme.

The method may further include generating a decision matrix with respect to the first and second data frames, and comparing the separately generated decision matrix with a predetermined threshold value to thereby determine the constellation mapping scheme.

Each of the first and second constellation mapping schemes may apply a constellation of mutually different schemes for a corresponding time interval in each of the first and second data frames.

Other features and aspects will be apparent from the following detailed description, the drawings, and the claims.

Throughout the drawings and the detailed description, unless otherwise described, the same drawing reference numerals will be understood to refer to the same elements, features, and structures. The relative size and depiction of these elements may be exaggerated for clarity, illustration, and convenience.

DETAILED DESCRIPTION

The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. The progression of processing steps and/or operations described is an example; however, the sequence of and/or operations is not limited to that set forth herein and may be changed as is known in the art, with the exception of steps and/or operations necessarily occurring in a certain order. Also, description of well-known functions and constructions may be omitted for increased clarity and conciseness.

Figure 1A:
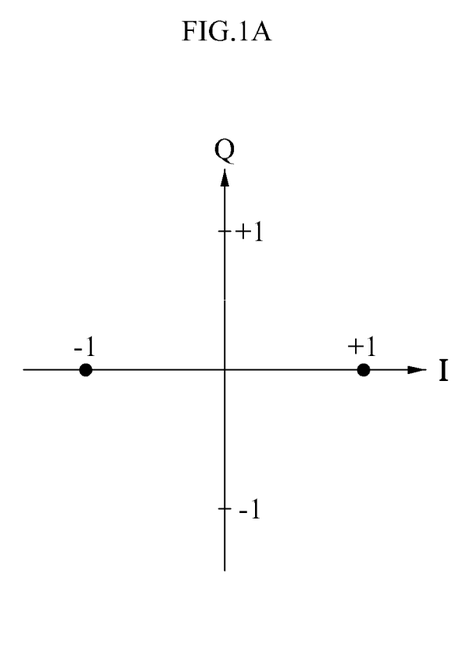
FIGS. 1A and 1B show diagrams illustrating an example of constellation mapping schemes according to an embodiment.
Figure 1B:
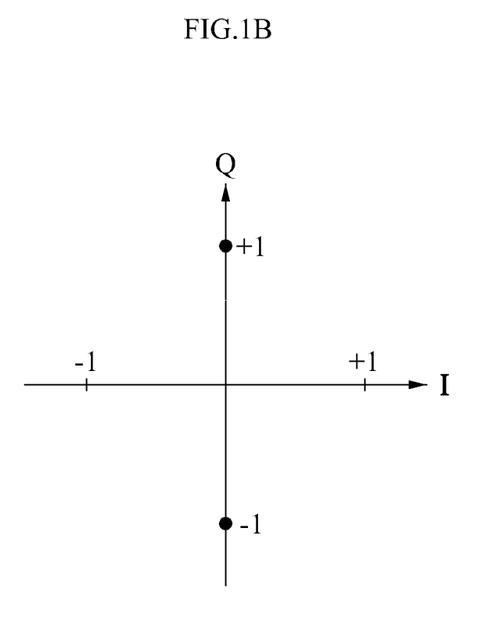

FIGS. 1A and 1B show diagrams illustrating an example of constellation mapping schemes according to an embodiment. As the cases may be, the I-axis and Q-axis may refer to the in phase and the quadrature, respectively.

FIG. 1A is a constellation diagram illustrating a binary phase-shift keying (BPSK) constellation mapping scheme. Referring to the constellation diagram of FIG. 1A, in the BPSK constellation mapping scheme, a data symbol may be mapped into one of two points on a real axis of a complex number plane, in accordance with a value of the data symbol. For example, in the constellation diagram of FIG. 1A, the data symbol may be mapped into '+1' or '−1' on the complex number plane in accordance with the value of the data symbol.

FIG. 1B is a constellation diagram illustrating a quadrature BPSK (QBPSK) constellation mapping scheme. Referring to the constellation diagram FIG. 1B, in the QBPSK constellation mapping scheme, a data symbol may be mapped into one of two points on an imaginary axis on the complex number plane in accordance with the value of the data symbol. For example, in the constellation diagram of FIG. 1B, the data symbol may be mapped into '+j' or '−j' on the complex number plane in accordance with the value of the data symbol.

Figure 2A:
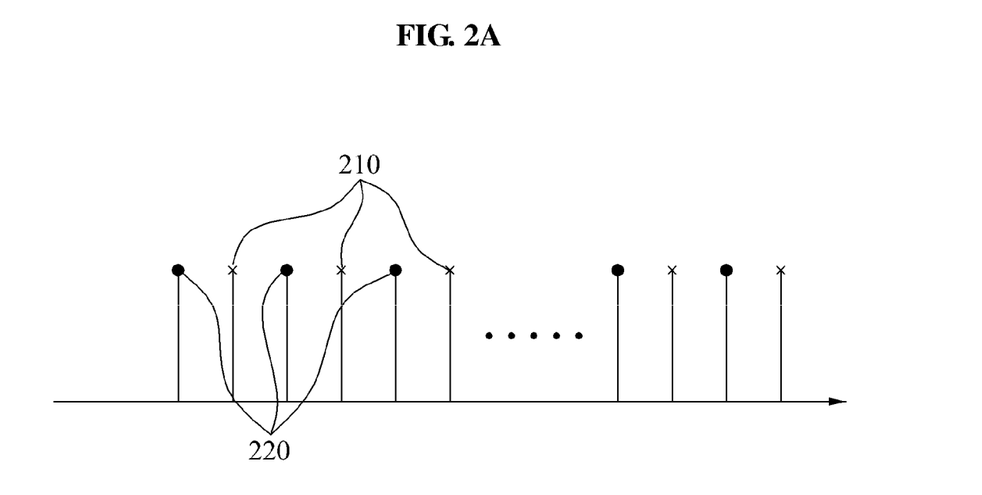
FIGS. 2A through 2C show diagrams to illustrate an example of another constellation mapping scheme according to an embodiment.
Figure 2B:
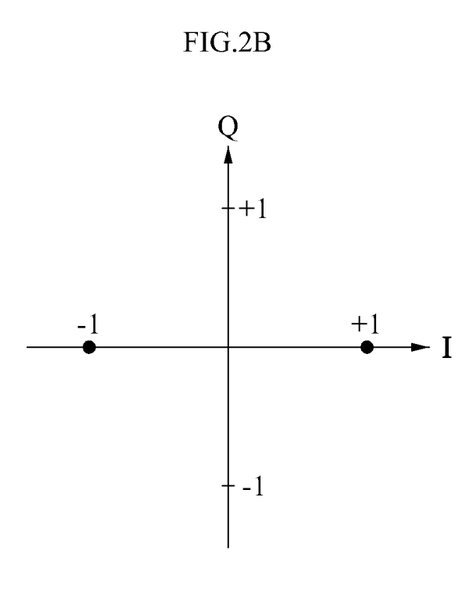
Figure 2C:
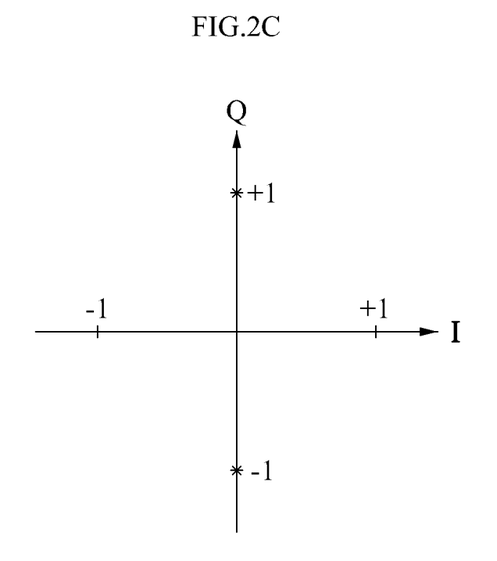

FIGS. 2A through 2C are diagrams to illustrate an example of another, for example, alternative, constellation mapping scheme according to an embodiment.

According to an embodiment, a data symbol may be modulated using an orthogonal frequency division multiplexing (OFDM) scheme. Based on the OFDM scheme, the data symbol may be modulated using a plurality of sub carriers.

When adopting an alternative BPSK (ABPSK) constellation mapping scheme, constellation mapping schemes different from each other may be applied to respective sub carriers constituting the same data symbol. For example, a first constellation mapping scheme may be applied to a part of the sub carriers constituting the same data symbol, and a second constellation mapping scheme may be applied to another part of the sub carriers.

In a diagram of FIG. 2A, a plurality of sub carriers constituting the same data symbol is illustrated, and a horizontal axis may denote a frequency band. According to an embodiment, the QBPSK constellation mapping scheme illustrated in a constellation diagram of FIG. 2C may be applied to sub carriers 210 of the plurality of sub carriers, and the BPSK constellation mapping scheme illustrated in a constellation diagram of FIG. 2B may be applied to another sub carriers 220. For example, the QBPSK constellation mapping scheme may be applied to an odd-numbered sub carriers 210, and the BPSK constellation mapping scheme may be applied to an even-numbered sub carriers 220.

With reference to FIGS. 2A through 2C, the constellation mapping schemes different from each other may be applied to the odd-numbered sub carriers and the even-numbered sub carriers, from among the plurality of sub carriers constituting the same data symbol. However, a data transmission apparatus may change an index of each of the sub carriers where different constellation mapping schemes are applied.

Also, the constellation mapping schemes different from each other may be applied to the plurality of sub carriers constituting the same data symbol. But, according to another embodiment, the data transmission apparatus may adopt the constellation mapping schemes different from each other within a specific time interval of a data frame, and a data receiving apparatus may determine the constellation mapping schemes adopted within the specific time interval to discriminate the data frame.

Figure 3A:
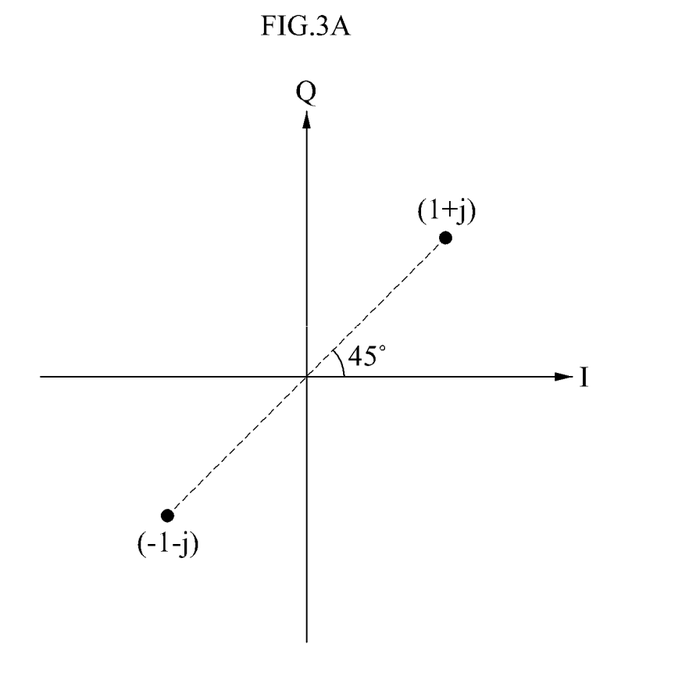
FIGS. 3A and 3B show diagrams illustrating an example of a diagonal constellation mapping scheme according to an embodiment.
Figure 3B:
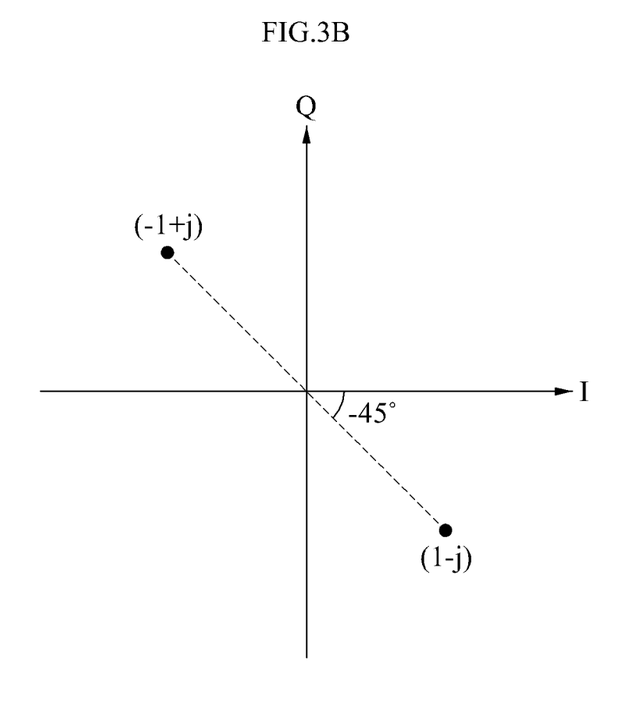

FIGS. 3A and 3B show diagrams illustrating an example of a diagonal constellation mapping scheme.

FIG. 3A is a constellation diagram illustrating the diagonal constellation mapping scheme where a data symbol is mapped into one of two points on an axis having an angle '+45 degrees' from a real axis, in accordance with a value of the data symbol is illustrated. Since the axis where the data symbol is mapped has the angle of '+45 degrees' from the real axis, the constellation mapping scheme illustrated in FIG. 3A may be referred to as a +45 degree BPSK constellation mapping scheme. For example, in the constellation diagram of FIG. 3A, a data symbol may be mapped into '1+j' or '−1−j' on a complex number plane in accordance with the value of the data symbol. However, according to another embodiment, the data symbol may be mapped into different positions on a diagonal line.

FIG. 3B is a constellation diagram illustrating the diagonal constellation mapping scheme where a data symbol may be mapped into one of two points on an axis having an angle of '−45 degrees' from a real axis, in accordance with a value of the data symbol is illustrated. Since the axis where the data symbol is mapped has the angle of '−45 degrees' from the real axis, the constellation mapping scheme illustrated in FIG. 3 may be referred to as a −45 degree BPSK constellation mapping scheme. For example, in the constellation diagram FIG. 3B, a data symbol may be mapped into '−1+j' or '1−j' on the complex number plane. However, according to another embodiment, the data symbol may be mapped into different positions on a diagonal line.

Although not illustrated, an ABPSK constellation mapping scheme using the +45 degree BPSK constellation mapping scheme of the constellation diagram of FIG. 3A and the −45 degree BPSK constellation mapping scheme of the constellation diagram of FIG. 3B may be used. For example, the +45 degree BPSK constellation mapping scheme may be applied to a part of a plurality of sub carriers constituting the same data symbol, and the −45 degree BPSK constellation mapping scheme may be applied to another parts of the plurality of sub carriers. According to an embodiment, the +45 degree BPSK constellation mapping scheme may be applied to an odd-numbered sub carriers, and the −45 degree BPSK constellation mapping scheme may be applied to an even-numbered sub carriers, and vice versa in another embodiment.

Figure 4:
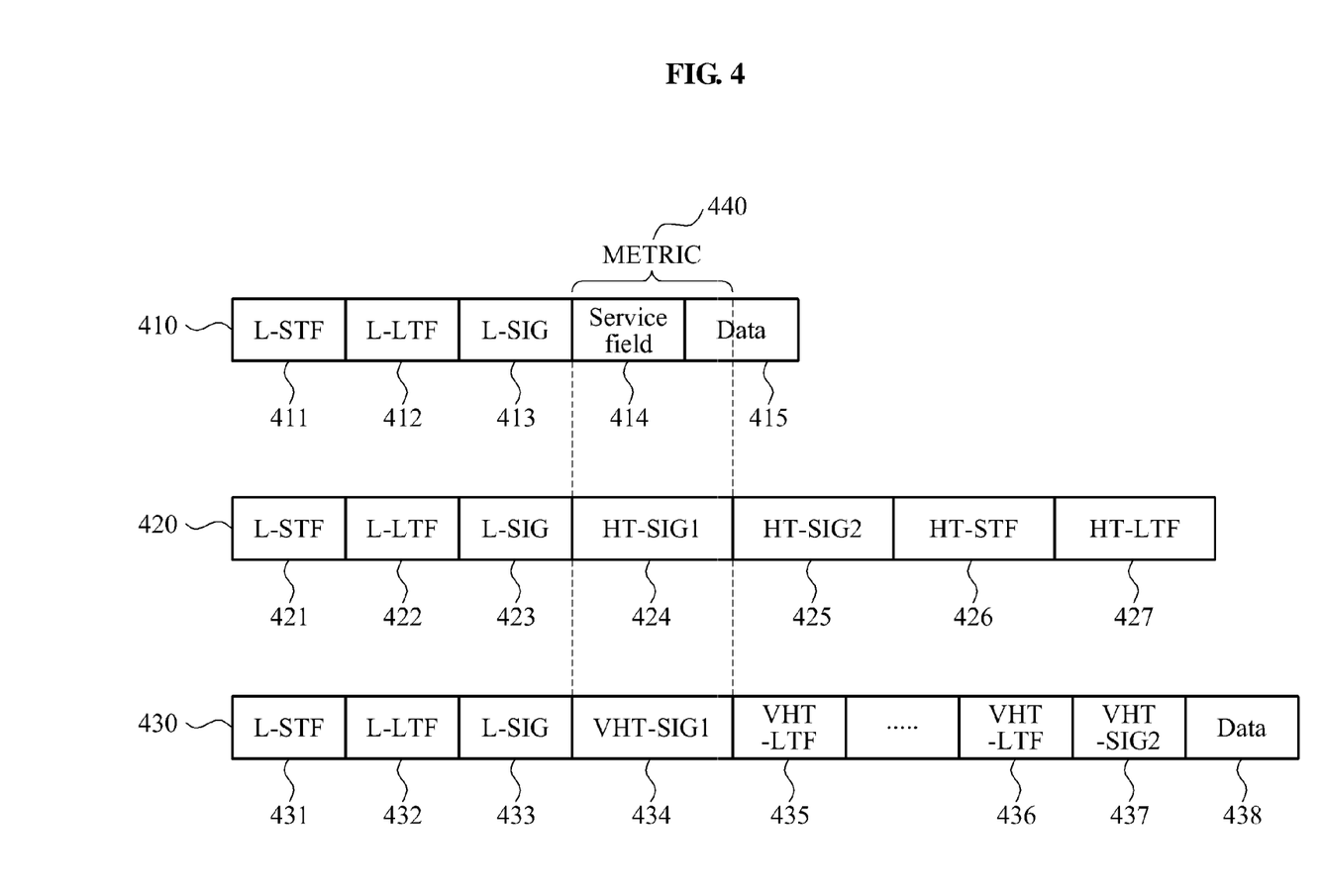
FIG. 4 is a diagram illustrating a format of a data frame according to an embodiment.

FIG. 4 is a diagram illustrating a format of a data frame according to an embodiment.

In FIG. 4, three data frames 410, 420, and 430 are illustrated. A first data frame 410 may be a legacy data frame according to a 802.11a standard, a second data frame 420 may be a high throughput (HT)-mixed data frame according to a 802.11n standard, and a third data frame 430 may be a very high throughput (VHT)-mixed data frame according to a 802.11ac standard. It is understood that 802.11a, 802.11n and 802.11ac standards are examples and that embodiments and implementations consistent with the disclosures provided herein are not limited thereto.

The legacy data frame 410 may include a legacy short training field (L-STF) 411, a legacy long training field (L-LTF) 412, a legacy signal field (L-SIG) 413, and a data field 415.

The HT-mixed data frame 420 may include an L-STF 421, an L-LTF 422, an L-SIG 423, an HT-SIG 1 424, an HT-SIG 2 425, an HT-STF 426, and an HT-LTF 427. The HT-SIG 1 424 and the HT-SIG 2 425 may indicate a high throughput signal field, the HT-STF 426 may indicate a high throughput short training field, and the HT-LTF 427 may indicate a high throughput long training field.

The HT-mixed data frame 420 may include the HT-SIG1 424 and the HT-SIG 2 425, the HT-STF 426, and the HT-LTF 427 to provide high-speed data transmission services to a data receiving apparatus according to a 802.11n standard, and include the L-STF 421, the L-LTF 422, and the L-SIG 423 to provide the data transmission services to a data receiving apparatus according to a 802.11a standard.

Accordingly, a data receiving apparatus according to the 802.11n standard may be interoperable with a data transmission apparatus according to an 802.11a standard and a data transmission apparatus according to an 802.11n standard. When the data receiving apparatus according to the 802.11n standard receives the legacy data frame 410, the data receiving apparatus may decode the legacy data frame 410 in accordance with the 802.11a standard. Also, when the data receiving apparatus according to the 802.11n standard receives the HT-mixed data frame 420, the data receiving apparatus may decode the HT-mixed data frame 420 in accordance with the 802.11n standard.

According to an embodiment, the data transmission apparatus according to the 802.11n standard may apply the BPSK constellation mapping scheme to the L-SIG 423 of the data frame, and apply the QBPSK constellation mapping scheme to the HT-SIG1 424 and the HT-SIG2 425.

The data receiving apparatus according to the 802.11n standard may determine that the HT-mixed data frame 420 is the data frame according to the 802.11n standard, based on the constellation mapping schemes applied to the L-SIG 423, the HT-SIG1 424, and the HT-SIG2 425. The data receiving apparatus may not need to decode an entire HT-mixed data frame in order to determine the data transmission standard corresponding to that frame. Accordingly, the data receiving apparatus may more rapidly determine the applicable data transmission standard applied to the HT-mixed data frame, based on the constellation mapping scheme of a part of the HT-mixed data frame.

The VHT-mixed data frame 430 may include an L-STF 431, an L-LTF 432, an L-SIG 433, VHT-SIGs 434 and 437, VHT-LTFs 435 and 436, and a data field 438. The VHT-SIG 1 434 and the VHT-SIG 2 437 may denote a very high throughput signal field, and the VHT-LTFs 436 and 436 may denote a high through long training field.

According to an embodiment, a data transmission apparatus according to the 802.11ac standard may apply an ABPSK constellation mapping scheme to the VHT-SIG1 434. The ABPSK constellation mapping scheme has been described with reference to FIGS. 2A-C and 3A-B, and thus further descriptions thereof will be omitted for conciseness.

Accordingly, a data receiving apparatus according to the 802.11ac standard may determine that the VHT-mixed data frame 430 is a data frame according to the 802.11ac standard, based on the constellation mapping scheme applied to the VHT-SIG1 434.

According to an embodiment, the data receiving apparatus may designate, as a metric region 440, a mutually corresponding field among the legacy data frame 410, the HT-mixed data frame 420, and the VHT-mixed data frame 430, and discriminate a data transmission standard applied to each of the data frames, based on the constellation mapping scheme applied to the metric region 440.

When the respective data frames 410, 420, and 430 are modulated using an OFDM scheme, for example, the data receiving apparatus may generate a decision metric with respect to the respective data frames 410, 420, and 430, and discriminate the respective data frames 410, 420, and 430 using the generated decision metric. According to an embodiment, the data receiving apparatus may generate a metric with respect to each of the data frames 410, 420, and 430 using Equation 1 below, and generate a decision metric with respect to each of the data frames 410, 420, and 430 based on the generated metric.

$$Met1 = \sum_{S_R} (|\text{Real}|^2 - |\text{Imag}|^2) \quad \text{[Equation 1]}$$

$$Met2 = \sum_{S_I} (|\text{Imag}|^2 - |\text{Real}|^2).$$

In Equation 1, $S_R$ denotes a set of sub carriers using a real axis of each data frame, and $S_I$ denotes a set of sub carriers using an imaginary axis of each data frame.

According to another embodiment, the data receiving apparatus may mutually combine, constructively or destructively, the data frames to generate the metric.

The data receiving apparatus may apply a decision metric using Equation 2 below based on each metric obtained in Equation 1.

$$\text{Sum\_Met } 1 = Met1 + Met2$$

$$\text{Sum\_Met } 2 = Met1 - Met2. \quad \text{[Equation 2]}$$

As described above, when the BPSK constellation mapping scheme is applied to the metric region 440 of the legacy data frame 410, the QBPSK constellation mapping scheme or a quadrature amplitude modulation (QAM) constellation mapping scheme is applied to a metric region 424 of the HT-mixed data frame 320, that is, the HT-SIG 1 424, and the ABPSK constellation mapping scheme is applied to a metric region 434 of the VHT-mixed data frame 430, that is, the VHT-SIG 1 434, a value of the decision metric obtained by Equation 2 may be as follows in Table 1.

TABLE 1

|  | legacy | HT-SIG | VHT-SIG |
| --- | --- | --- | --- |
| Constellation | BPSK or QAM | QBPSK | ABPSK |
| Sum_Met 1 | 0 | 0 | Big(+) |
| Sum_Met 2 | 0~Big(+) | Big(−) | 0 |

Referring to Table 1, a first decision metric (Sum_Met 1) of the legacy data frame 410 may be '0', and a second decision metric (Sum_Met 2) thereof may be a value in a range of '0' to a predetermined (+) value.

Also, a first decision metric (Sum_Met 1) of the HT-data frame 420 may be '0', and a second decision metric (Sum_Met 2) thereof may be a value in a range of '0' to a predetermined (−) value.

Also, a first decision metric (Sum_Met 1) of the VHT-data frame 430 may be a (+) value more than '0', and a second decision metric (Sum_Met 2) thereof may be '0'

The data receiving apparatus may discriminate the received data frame in accordance with an algorithm shown in the following Table 2.

TABLE 2 if(Sum_Met 1 > threshold 1)
   Frame_format = VHT_mixed
else if(Sum_Met 2 > threshold 2)
   Frame_format = Legacy
else
   Frame_format = HT_mixed
end In Table 2, the data receiving apparatus may compare a value of the first decision metric (Sum_Met 1) and a first threshold value. When the value of the first decision metric (Sum_Met 1) is greater than the first threshold value, the data receiving apparatus may determine that the received data frame is the VHT-mixed data frame according to the 802.11ac standard.

When the value of the first decision metric (Sum_Met 1) is less than the first threshold value, and when a value of the second decision metric (Sum_Met 2) is greater than a second threshold value, the data receiving apparatus may determine that the received data frame is the legacy data frame according to the 802.11a standard.

When the value of the first decision metric (Sum_Met 1) is less than the first threshold value, and when the value of the second decision metric (Sum_Met 2) is less than the second threshold value, the data receiving apparatus may determine that the received data frame is the HT-mixed data frame according to the 802.11n standard.

According to an embodiment, the data receiving apparatus may determine a first threshold value (threshold 1) and a second threshold value (threshold 2) using the following Equation 3.

$$\text{Threshold } 1 = \text{Big}(+)/2, \text{ and}$$

$$\text{Threshold } 2 = \text{Big}(-)/2. \quad \text{[Equation 3]}$$

A method of discriminating a data frame has been described with reference to Equations 1 to 3. In each step of the algorithm of discriminating the data frame, as shown in Table 2, each of the threshold values may be determined as being an intermediate value of two metrics of which a difference, from among metrics of the respective data frames, is a minimum.

Figure 5:
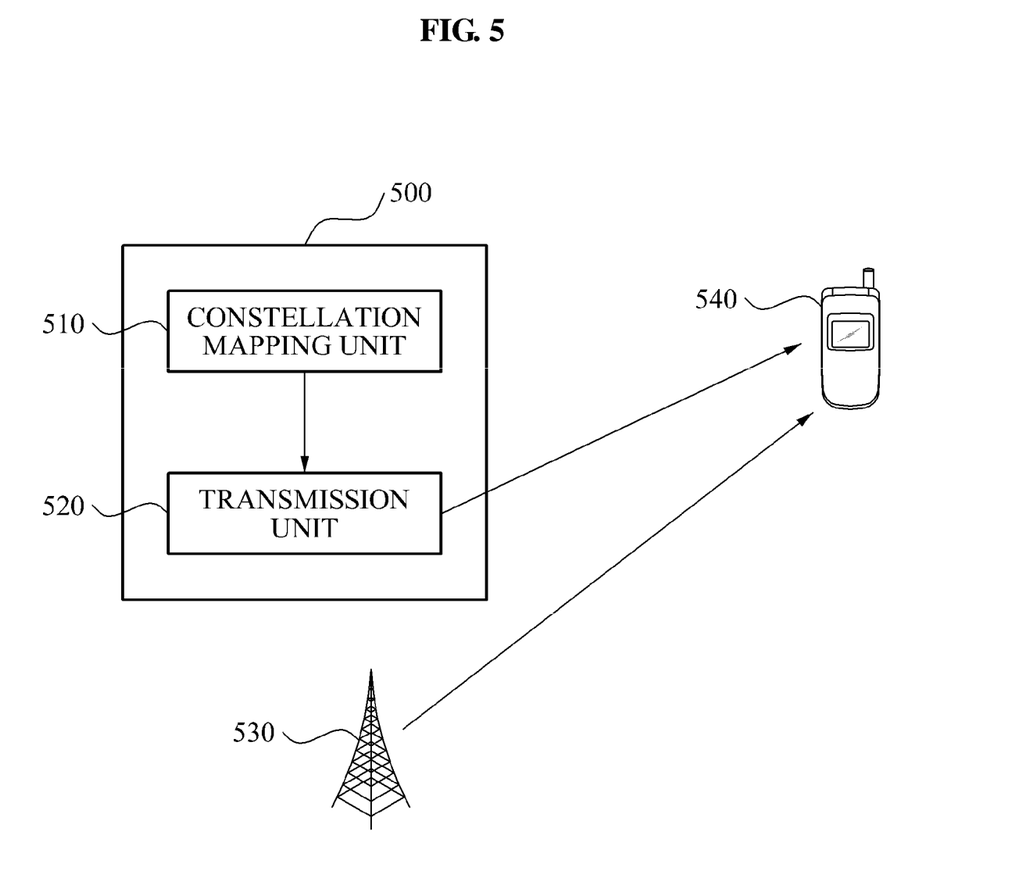
FIG. 5 is a diagram illustrating a structure of a data transmission apparatus according to an embodiment.

FIG. 5 shows a structure of a data transmission apparatus 500 according to an embodiment.

The data transmission apparatus 500 includes a constellation mapping unit 510 and a transmission unit 520.

The constellation mapping unit 510 may apply a first constellation mapping scheme to a first data frame. According to an embodiment, the first constellation mapping scheme may include at least one of a BPSK constellation mapping scheme, a QBPSK constellation mapping scheme, a +45 degree BPSK constellation mapping scheme, a −45 degree BPSK constellation scheme, and an ABPSK constellation mapping scheme. The above constellation mapping schemes have been described with reference to FIGS. 1A to 3B and thus, further descriptions thereof will be omitted herein for conciseness.

According to an embodiment, the first data frame may be modulated using an OFDM scheme. In this case, respective data symbols included in the first data frame may be modulated using the OFDM scheme. In the ABPSK constellation mapping scheme, constellation mapping schemes different from each other may be applied to each of a plurality of sub carriers constituting the same data symbol. According to an embodiment, the ABPSK constellation mapping scheme may be applied to the first data frame.

The constellation mapping unit 510 may group a plurality of sub carriers constituting an OFDM symbol included in the first data frame into a first sub carrier group and a second sub carrier group, and apply, to each of the first sub carrier group and the second sub carrier group, the constellation mapping scheme different from each other.

According to an embodiment, the constellation mapping unit 510 may adopt the ABPSK constellation mapping scheme where the BPSK constellation mapping scheme is applied to the first sub carrier group, and the QBPSK constellation mapping scheme is applied to the second sub carrier group.

According to another embodiment, the constellation mapping unit 510 may adopt the ABPSK constellation mapping scheme where the +45 degree BPSK constellation mapping scheme is applied to the first sub carrier group, and the −45 degree BPSK constellation mapping scheme is applied to the second sub carrier group.

According to an embodiment, the constellation mapping unit 510 may apply a first constellation mapping scheme to only a part of a time interval of the first data frame. The time intervals where the constellation mapping schemes are adopted in the first data frame and the second data frame may be the same.

The transmission unit 520 may transmit, to a data receiving apparatus 540, the first data frame where the first constellation mapping scheme is adopted.

The data receiving apparatus 540 may receive the first data frame where the first constellation mapping scheme is adopted, and may receive the second data frame where the second constellation mapping scheme is adopted.

The data receiving apparatus 540 may determine the constellation mapping scheme adopted in each data frame with respect to a specific time interval. When the constellation mapping schemes adopted in the respective data frames are different from each other, the data receiving apparatus 540 may discriminate the data frame in accordance with the constellation mapping scheme.

The data receiving apparatus 540 may determine the constellation mapping scheme adopted in each data frame, and discriminate the data frame in accordance with the constellation mapping scheme.

For example, when the BPSK constellation mapping scheme is adopted in the first data frame, the data receiving apparatus 540 may discriminate the first data frame as being the legacy data frame according to the 802.11a standard.

Also, when the QBPSK constellation mapping scheme is adopted in the second data frame, the data receiving apparatus 540 may discriminate the second data frame as being the HT-mixed data frame according to the 802.11n standard. Also, when the ABPSK constellation mapping scheme is adopted in a third data frame, the data receiving apparatus 540 may discriminate the third data frame as being the VHT-mixed data frame according to the 802.11ac standard.

According to an embodiment, the time interval where the constellation mapping scheme is adopted in each data frame may be changed depending on a state of the channel, requirements of the data receiving apparatus 540, and the like.

Figure 6:
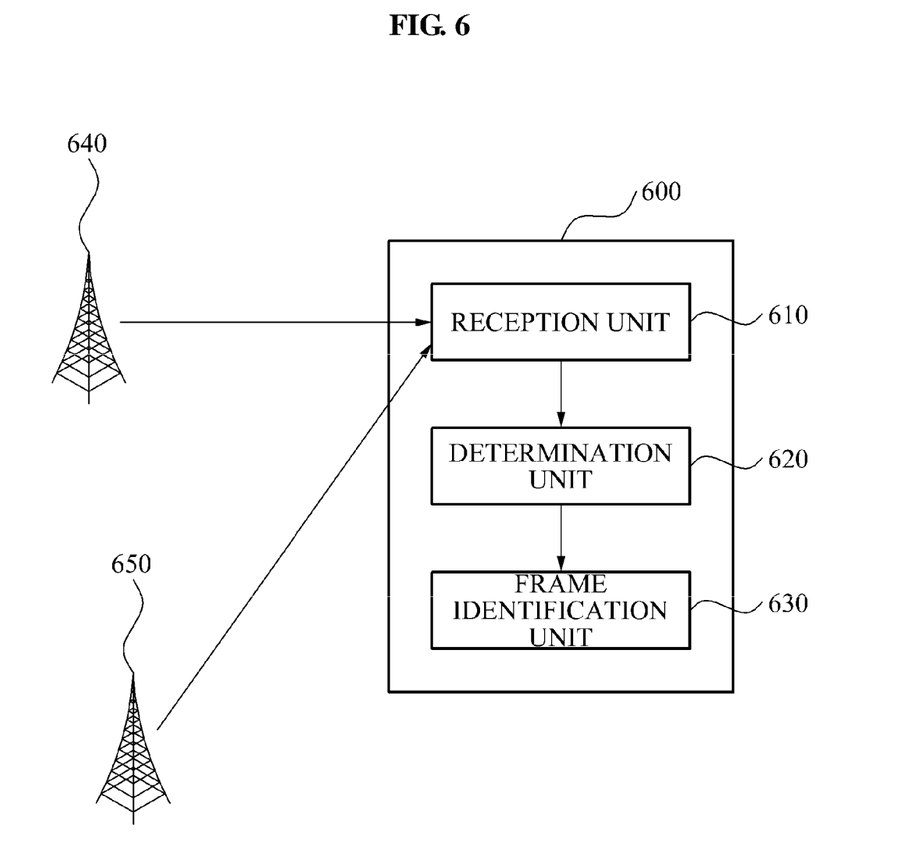
FIG. 6 is a diagram illustrating a structure of a data receiving apparatus according to an embodiment.

FIG. 6 shows a structure of a data receiving apparatus 600 according to an embodiment.

The data receiving apparatus 600 includes a reception unit 610, a determination unit 620, and a frame identification unit 630.

The reception unit 610 may receive a first data frame where a first constellation mapping scheme is adopted, and a second data frame where a second constellation mapping scheme is adopted. According to an embodiment, the first constellation mapping scheme or the second constellation mapping scheme may include at least one of a BPSK constellation mapping scheme, a QBPSK constellation mapping scheme, a +45 degree BPSK constellation mapping scheme, and a −45 degree BPSK constellation mapping scheme. These constellation mapping schemes have been described with reference to FIGS. 1A to 3B, and thus further descriptions thereof will be omitted herein for conciseness.

According to an embodiment, for the same time interval or a mutually corresponding time interval of the first data frame and the second data frame, the first constellation mapping scheme or the second constellation mapping scheme may be adopted. The first constellation mapping scheme and the second constellation mapping scheme may be different from each other.

The determination unit 620 may determine the constellation mapping scheme applied to each of the first and second data frames. According to an embodiment, the determination unit 620 may individually generate a decision metric with respect to each of the data frames, and compare the generated decision metric and a predetermined threshold value to thereby determine the constellation mapping scheme applied to each of the data frames.

According to an embodiment, each of the data frames may be modulated using an OFDM scheme. In this case, the determination unit 620 may constructively or destructively combine a part of the data frames to thereby generate the decision metric, and discriminate the data frames by comparing each of the decision metrics and a threshold value. According to an embodiment, the determination unit 620 may determine each of the threshold values as being an intermediate value of two metrics of which a difference, from among metrics of the respective data frames, is a minimum.

Figure 7:
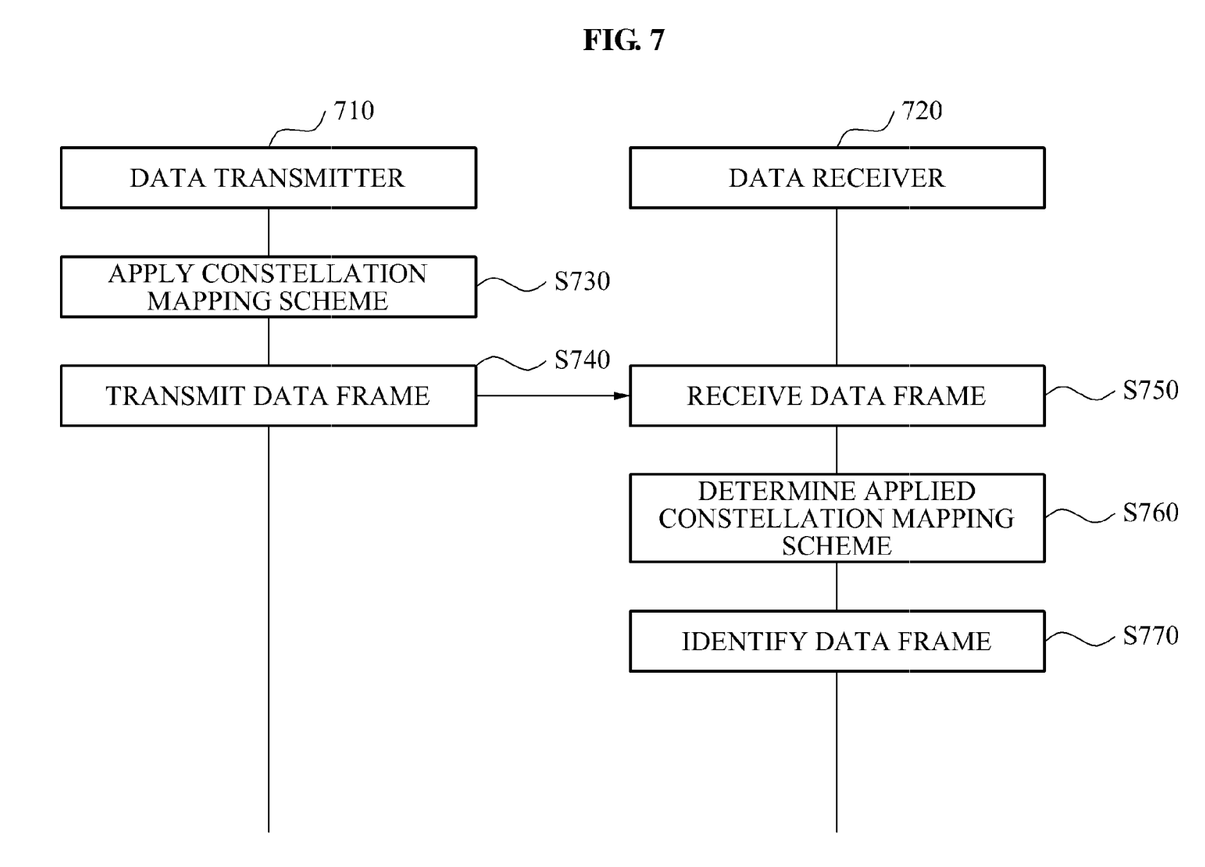
FIG. 7 is a flowchart illustrating a method of discriminating a data frame according to an embodiment.

FIG. 7 is a flowchart illustrating a method of discriminating a data frame according to an embodiment.

In operation S730, a data transmission apparatus 710 may apply a first constellation mapping scheme to a first data frame. According to an embodiment, the first constellation mapping scheme may include at least one of the BPSK constellation mapping scheme, the QBPSK constellation mapping scheme, the +45 degree BPSK scheme, the −45 degree BPSK constellation mapping scheme, and the ABPSK constellation mapping scheme, examples of which are illustrated in FIGS. 1A to 3B.

In operation S740, the data transmission apparatus 710 may transmit, to a data receiving apparatus 720, the first data frame where the first constellation mapping scheme is applied.

In operation S750, the data receiving apparatus 720 may receive, from the data transmission apparatus 710, the first data frame where the first constellation mapping scheme is applied, and also receive, from a second data transmission apparatus (not shown), a second data frame where a second constellation mapping scheme is applied.

According to an embodiment, the data transmission apparatus 710 may apply the first constellation mapping scheme only to a part of a time interval of the first data frame. In this case, the time intervals where the constellation mapping schemes are applied to the first data frame and the second data frame may correspond to each other or may be the same.

In operation S760, the data receiving apparatus 720 may determine the constellation mapping scheme applied to each data frame. According to an embodiment, the data receiving apparatus 720 may individually generate a decision metric with respect to each data frame, and compare the generated decision metric and a predetermined threshold to thereby determine the constellation mapping scheme applied to each data frame.

According to an embodiment, the data receiving apparatus 720 may constructively or destructively combine a part of the data frames to thereby generate metrics, as described above with reference to FIGS. 1A to 3B. The data receiving apparatus 720 may combine the generated metrics to generate the decision metric, and compare the decision metric and the threshold value to thereby discriminate each data frame.

In operation S770, the data receiving apparatus 720 may discriminate the data frame in accordance with the constellation mapping scheme applied to each data frame.

For example, when the BPSK constellation mapping scheme is applied to a received data frame, the data receiving apparatus 720 may determine the received data frame as being a legacy data frame according to the 802.11a standard. Also, when the QBPSK constellation mapping scheme is applied to the received data frame, the data receiving apparatus 720 may determine the received data frame as being an HT-mixed data frame according to the 802.11n standard. Also, when the ABPSK constellation mapping scheme is applied to the received data frame, the data receiving apparatus 720 may determine the received data frame as being a VHT-mixed data frame according to the 802.11ac standard.

The processes, functions, methods and/or software described above may be recorded, stored, or fixed in one or more non-transitory computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of non-transitory computer-readable media include magnetic media such as hard disks, floppy disks, and magnetic tape; optical media such as CD-ROM disks and DVDs; magneto-optical media such as optical disks; and hardware devices that are specially configured to store and perform program instructions, such as read-only memory (ROM), random access memory (RAM), flash memory, and the like. Examples of program instructions include both machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

As a non-exhaustive illustration only, a data receiving apparatus described herein may refer to mobile devices such as a cellular/smart phone, a personal digital assistant (PDA), a tablet PC, a digital camera, a portable game console, and an MP3 player, a portable/personal multimedia player (PMP), a handheld e-book, a portable/personal global positioning system (GPS) navigation, and devices such as a high definition television (HDTV), an optical disc player, a setup box, and the like capable of wireless communication or communication consistent with that disclosed herein.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A data transmission apparatus, comprising:
a constellation mapping unit configured to apply a first constellation mapping scheme to a first data frame; and
a transmission unit configured to transmit the first data frame to a data receiving apparatus,
wherein the data receiving apparatus receives the first data frame, receives, from a second data transmission apparatus, a second data frame where a second constellation mapping scheme is applied, and discriminates the first data frame and the second data frame in accordance with each of the first and second constellation mapping schemes,
wherein the first data frame is modulated using an orthogonal frequency division multiplexing (OFDM) scheme.
wherein the constellation mapping unit is further configured to group, into a first sub carrier group and a second sub carrier group, a plurality of sub carriers of an OFDM symbol included in the first data frame, and
wherein the first constellation mapping scheme applies a constellation mapping scheme mutually different with respect to the first sub carrier group and the second sub carrier group.

2. The data transmission apparatus of claim 1, wherein each of the first and second constellation mapping schemes applies a constellation of mutually different schemes for a corresponding time interval in each of the first and second data frames.

3. The data transmission apparatus of claim 1, wherein the first constellation mapping scheme and/or the second constellation mapping scheme comprises a binary phase-shift keying (BPSK) constellation mapping scheme, or a quadrature BPSK (QBPSK) constellation mapping scheme, or a +45 degree BPSK constellation mapping scheme, or a −45 degree BPSK constellation mapping scheme, or any combination thereof.

4. The data transmission apparatus of claim 1, wherein the first constellation mapping scheme applies a constellation mapping scheme mutually different with respect to a first time interval and a second time interval, each time interval being included in the first data frame.

5. The data transmission apparatus of claim 1, wherein the constellation mapping unit is further configured to group, into the first sub carrier group, odd-numbered sub carriers from the plurality of sub carriers, and group, into the second sub carrier group, even-numbered sub carriers from the plurality of sub carriers.

6. The data transmission apparatus of claim 1, wherein the constellation mapping unit is further configured to apply a binary phase-shift keying (BPSK)constellation mapping scheme to the first sub carrier group, and apply a quadrature BPSK (QBPSK) constellation mapping scheme to the second sub carrier group.

7. The data transmission apparatus of claim 1, wherein the constellation mapping unit is further configured to apply a +45 degree binary phase-shift keying BPSK constellation mapping scheme to the first sub carrier group, and apply a −45 degree BPSK constellation mapping scheme to the second sub carrier group.

8. The data transmission apparatus of claim 1, wherein the constellation mapping unit is further configured to apply the first constellation mapping scheme to a predetermined time interval of the first data frame.

9. The data transmission apparatus of claim 1, wherein the constellation mapping unit is further configured to change a time interval where the first constellation mapping scheme is applied.

10. A data receiving apparatus, comprising:
a reception unit configured to receive a first data frame where a first constellation mapping scheme is applied, and receive a second data frame where a second constellation mapping scheme is applied;
a determination unit configured to separately generate a decision matrix with respect to the first and second data frames, and compare the separately generated decision matrix with a predetermined threshold value to determine a constellation mapping scheme applied to each of the first and second data frames; and a frame identification unit configured to identify the first data frame and the second data frame in accordance with the determined constellation mapping scheme.

11. The data receiving apparatus of claim 10, wherein each of the first and second constellation mapping schemes applies a constellation of mutually different schemes for a corresponding time interval in each of the first and second data frames.

12. The data receiving apparatus of claim 10, wherein the determination unit generates-is further configured to generate the decision matrix by adding a value of a real number portion of each of the first and second data frames and adding a value of an imaginary number portion of each of the first and second data frames.

13. The data receiving apparatus of claim 10, wherein the determination unit is further configured to generate the decision matrix by reducing a value of a real number portion of each of the first and second data frames and reducing a value of an imaginary number portion of each of the first and second data frames.

14. A method of receiving data by a data receiving apparatus, the method comprising:

receiving a first data frame where a first constellation mapping scheme is applied;

receiving a second data frame where a second constellation mapping scheme is applied;

separately generating a decision matrix with respect to the first and second data frames;

comparing the separately generated decision matrix with a predetermined threshold value to determine the constellation mapping scheme applied to each of the first and second data frames; and identifying the first data frame and the second data frame in accordance with the determined constellation mapping scheme.

15. The method of claim 14, wherein each of the first and second constellation mapping schemes applies a constellation of mutually different schemes for a corresponding time interval in each of the first and second data frames.

* * * * *